Jan. 20, 1959  J. L. FISH ET AL  2,869,434
HYDRAULIC VISE
Filed April 15, 1957  3 Sheets-Sheet 1
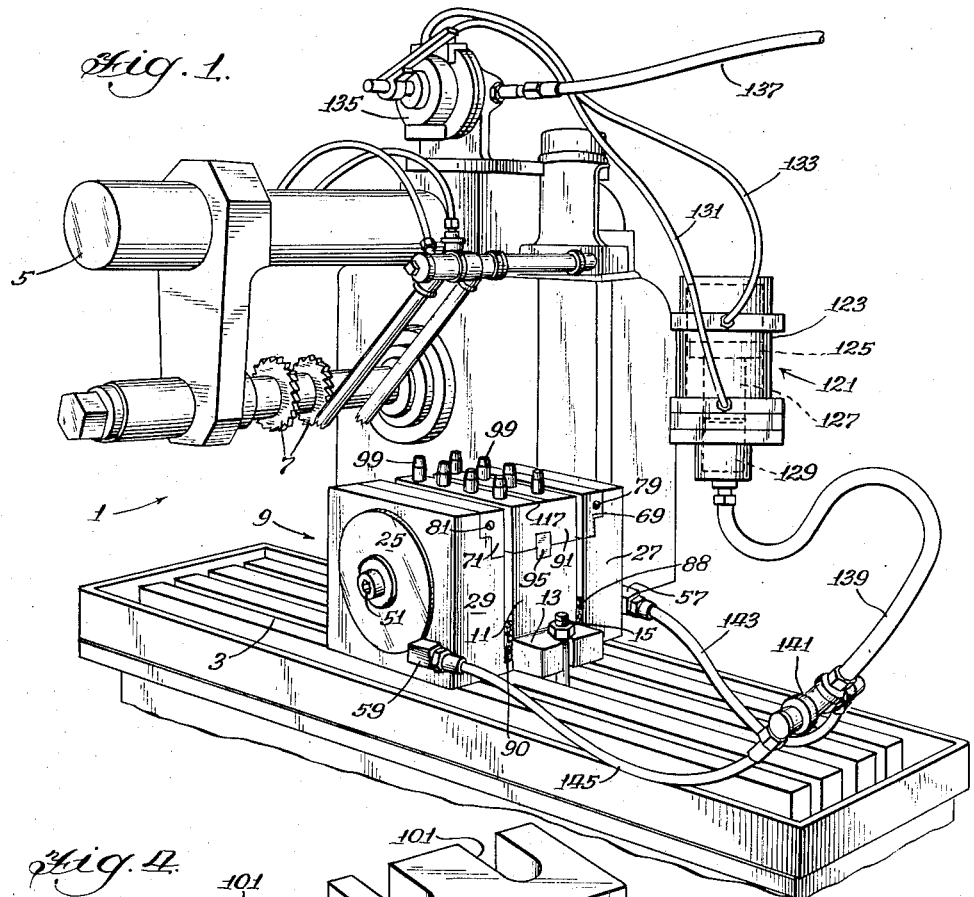
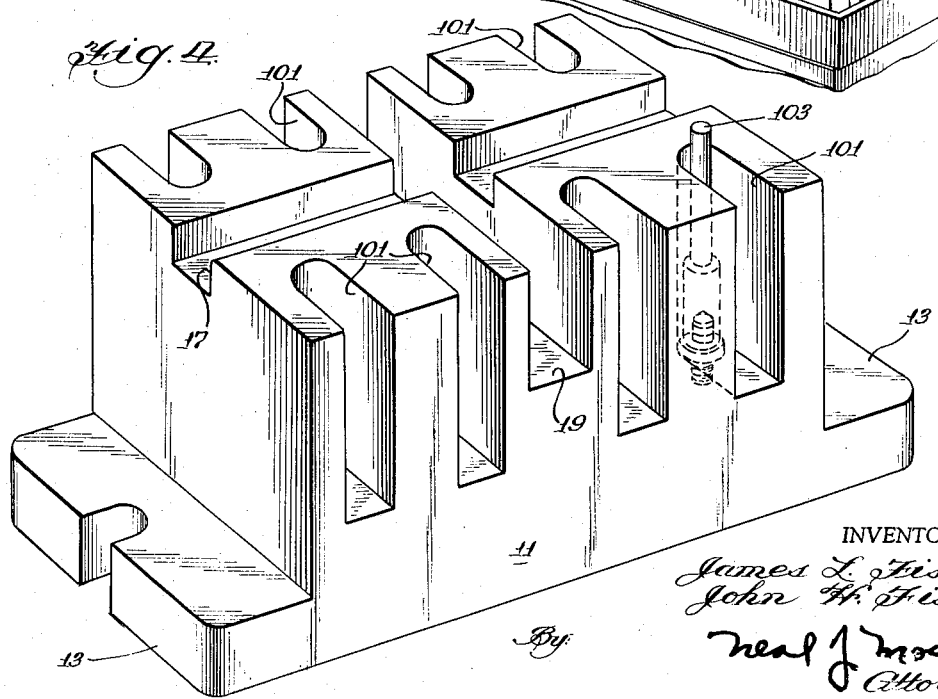
INVENTORS.
James L. Fish
John W. Fish
By Neal J. Mosely
Attorney

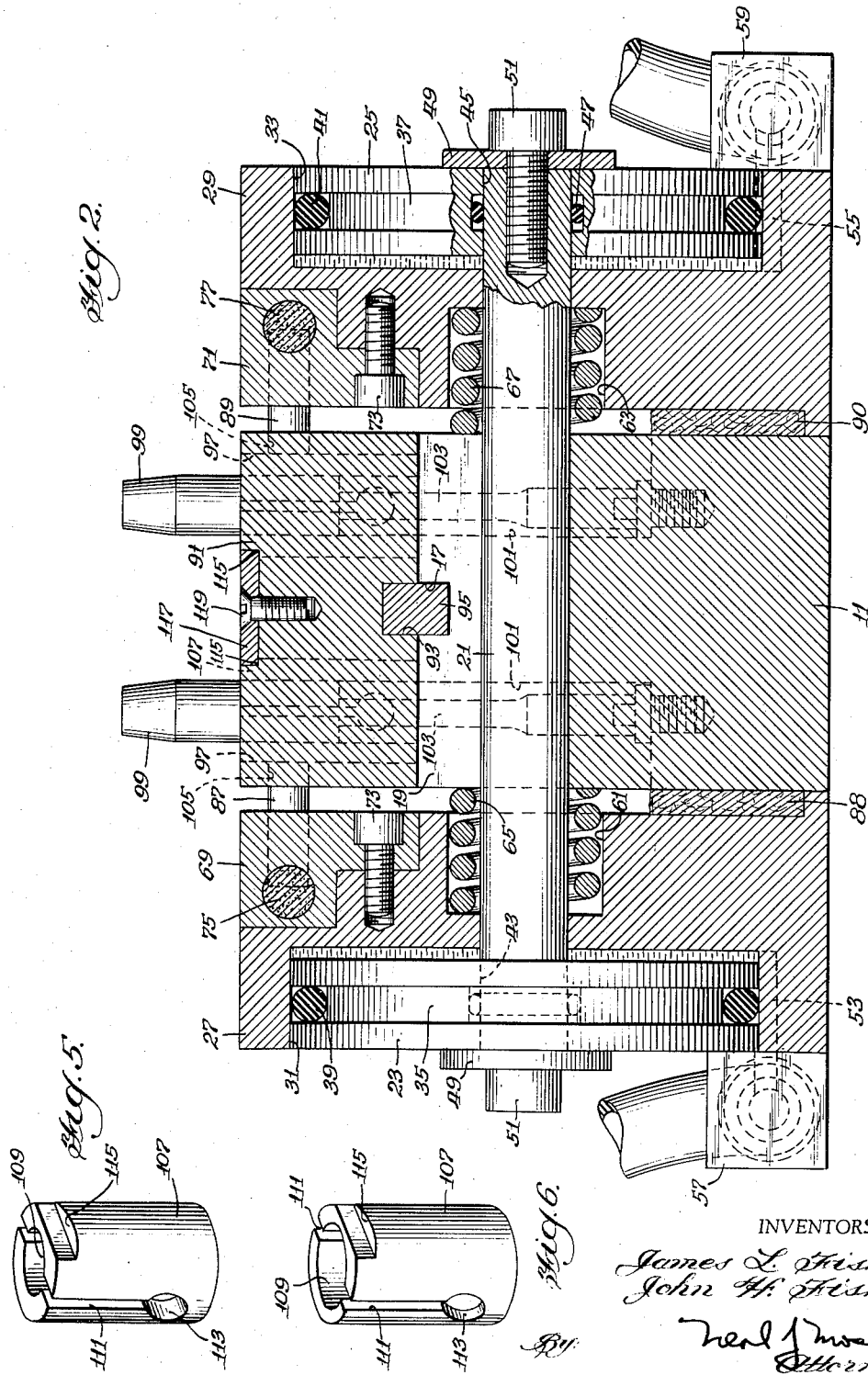

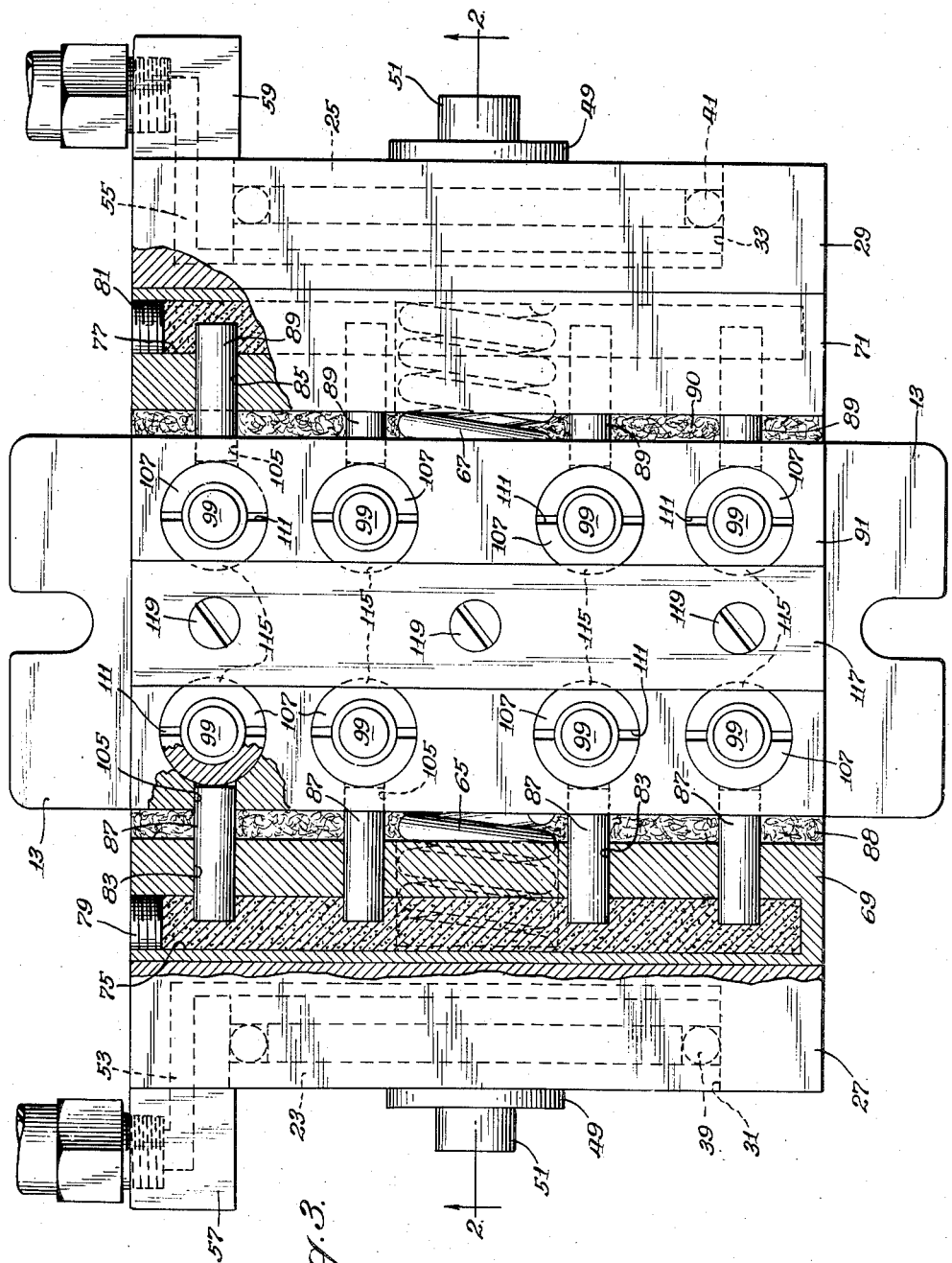

United States Patent Office 2,869,434
Patented Jan. 20, 1959

2,869,434

HYDRAULIC VISE

James L. Fish, Chicago, and John H. Fish, Hillside, Ill.

Application April 15, 1957, Serial No. 653,019

14 Claims. (Cl. 90—60)

This invention relates to new and useful improvements in work holders and more particularly to an hydraulically actuated vise for holding a plurality of work pieces securely in alignment for fine precision work in milling machines, shapers, drill presses, grinders and the like.

In the past, one of the greatest problems of the small machine shop has been the difficulty of "setting up" machines for small runs, particularly small runs of small parts. This difficulty has arisen from the lack of suitable work holders for a plurality of work pieces which would permit quick assembly of a large number of pieces, firmly held and accurately aligned for the desired machining or milling operation. As a result, it has often been necessary to design and assemble special work holders for each special job. This has placed such a high overhead on small runs as to make them economically impossible. There have been numerous attempts to devise multiple work piece holders which have not been very successful. These prior work holders have been difficult to work and inaccurate in alignment. Most prior work holders have been difficult to assemble on the machine with which they were to be used and have applied their clamping force irregularly to the work pieces.

It is therefore one object of this invention to provide a new and improved work holder for holding a plurality of work pieces in a milling machine or the like.

Another object is to provide a work holder for a plurality of work pieces which may be quickly and easily assembled on the machine with which it is to be used.

A further object is to provide a work holder for a plurality of work pieces permitting quick insertion and withdrawal of pieces, equalized pressure on all work pieces and accurate alignment with the machine on which it is installed.

A further object is to provide a work holder for a plurality of work pieces which is adaptable to a variety of sizes of work pieces.

A still further object is to provide a work holder for a work piece of variable size having means to apply equal clamping force to a number of separate points thereon.

A feature of this invention is the provision of a double acting hydraulically actuated vise having a pair of pistons mounted on a rod on a supporting base and supporting a pair of jaw members defining a pair of hydraulic motors and movable together for clamping in position a plurality of work pieces.

Another feature is the provision of a supporting member for the work pieces and a plurality of pins projecting from the jaw members for clamping individual work pieces or different points on a single work piece of variable size.

Another feature is the provision of an hydraulic system within each jaw member for equalizing pressure applied through said pins.

A further feature is the provision of a pneumatically operated hydraulic motor for supplying hydraulic pressure to the movable jaw members.

A still further feature is the provision of a supporting block for the work pieces having vertical bores of selected size with hollow cylindrical split collets therein having bores fitting the work pieces.

Other objects and features of this invention will be apparent from time to time throughout the specification and claims as hereinafter related.

In the accompanying drawings, to be taken as a part of this specification, there is fully and clearly illustrated a preferred embodiment of this invention, in which drawings, Figure 1 is a perspective view of a milling machine and hydraulic vise which form this invention, Figure 2 is a central section of the vise shown in Figure 1, as viewed on the section line 2—2 of Figure 3, Figure 3 is a plan view of the hydraulic vise shown in Figure 1, with portions of the jaw members shown in broken section to illustrate the pressure equalizing means for the clamping pins, Figure 4 is a perspective view of the supporting base member of the vise, and Figures 5 and 6 are detail perspective views of clamping collets for supporting the work pieces in the vise.

This invention consists of an improved hydraulically actuated vise for holding a plurality of separate work pieces for a machining operation in a milling machine, shaper, drill press or the like. This vise includes a supporting base member adapted to be secured on the movable table of a milling machine. A rod is supported on the base member with pistons at the outer ends thereof. Movable jaw members are supported on the rod and have recesses into which the pistons fit to define a pair of fluid motors. The jaw members each have a plurality of pins which extend into a closed passage filled with a wax-like material to make the pins adjustable for equalizing the pressure applied therethrough. A supporting block is positioned on the base member and is provided with vertical passages for receiving the work pieces and horizontal passages aligned with the pins so that movement of the jaw members will apply to the work pieces an equal clamping force through the clamping pins. Provision for the clamping of different size work pieces is made by use of hollow cylindrical split collets which fit the vertical recesses in the supporting block and have bores fitting the work pieces.

Referring to the drawings by numerals of reference, and more particularly to Figure 1, there is shown a milling machine 1, of conventional design, which includes a movable supporting table 3, an overhead arm 5, and a pair of milling cutters 7. An hydraulically actuated vise 9 is mounted on the table 3 for movement of the work pieces under the milling cutters 7.

The vise 9 includes a supporting base member 11 having end flanges 13 secured by bolts 15 or the like to the table 3. The base member 11 has a longitudinally extending key slot 17 and a laterally extending slot 19. In the slot 19 there is positioned a rod 21 which supports pistons 23 and 25 at opposite ends thereof. A pair of movable jaw members 27 and 29 are provided which have recesses 31 and 33 receiving the pistons 23 and 25 and defining therewith a pair of hydraulic motors. Pistons 23 and 25 have peripheral grooves 35 and 37 sealed by O rings 39 and 41, respectively. Pistons 23 and 25 have inner bores 43 and 45 sealed by O rings 47 and slide or "float" freely on the rod 21. At each end of the rod 21 there is provided a stop disc or washer 49 held in place by an Allen bolt 51, or the like.

The movable jaw members 27 and 29 have internal passages 53 and 55 leading to the space in the recesses 31 and 33, closed by pistons 23 and 25 and fittings 57 and 59 for connection to an hydraulic fluid source. The jaw members 27 and 29 have recesses 61 and 63 in which there are positioned springs 65 and 67 urging the jaw members outward.

Jaw members 27 and 29 have removable blocks 69 and 71 secured in place by Allen bolts 73, or the like. Blocks 69 and 71 have longitudinal passages 75 and 77 closed by threaded plugs 79 and 81, and laterally extending passages 83 and 85. Clamping pins 87 and 89 are positioned in passages 83 and 85 and extend into passages 75 and 77. The space in passages 75 and 77 is completely filled with a wax-like substance (wax, tar, or the like) which provides an hydraulic adjustment for pins 87 and 89. Blocks 69 and 71 may be replaced with other blocks of the same size having different numbers and/or sizes of pins 87 and 89.

On the supporting base member 11 there is positioned a block member 91 having a key slot 93 matching the key slot 17 and secured in position by a key bar 95 positioned therein. Supporting block 91 has vertical passages 97 for receiving the work pieces 99. Supporting base 11 has vertically extending recesses 101 into which longer work pieces may extend and in which there may be positioned stop members 103 of varying lengths to determine the vertical position of work pieces 99. Supporting block 91 also has horizontally extending passages 105 opening into recesses 97 and aligned with and receiving the ends of clamping 87. The recesses 101 in base 11 are designed for easy removal of chips which may accumulate. Felt pads 88 and 90 are also provided between jaw members 27 and 29 and block 91 and base 11 to prevent accumulation of chips therebetween.

In the recesses 101 there are positioned collets 107 for each of work pieces 99. Collets 107 are hollow and have outside diameters fitting the recesses 101 and bores 109 fitting the individual work pieces 99. Collets 107 have diametrically opposed slots 111 through the wall thereof terminating in apertures 113 which permit flexing of the walls for clamping work pieces 99 in position. At the upper end of each of collets 107 there is machined a flat 115 against which there is positioned a retaining bar 117, held in place by screws 119, which secures collets 107 in position and prevents the same from rotating. As shown in Figures 5 and 6 the collets may have different bores 109 to receive work pieces of different sizes or shapes.

The power for actuating this vise is provided by a pneumatically operated hydraulic motor 121, which consists of an enclosed cylinder 123 having a pneumatic piston 125 actuating a hydraulic booster piston 127 movable into a pumping chamber 129. Cylinder 123 has hose connections 131 and 133 leading to air valve 135 which is in turn connected by hose 137 to a source of compressed air. Pumping chamber 129 is connected by hose 139, T 141, and branch hoses 143 and 145 to fitting 57 and 59 for supplying hydraulic pressure for moving jaw members 27 and 29.

*Operation*

In assembling this apparatus for operation the base 11 is secured on movable table 3 by bolts 15. Jaw members 27 and 29 and pistons 23 and 25 are placed in position with rod 21 supported in slot 19 in base 11. Supporting block 91 is positioned on top of base 11 and secured against lateral movement by keybar 95. Jaw members 27 and 29 are retracted sufficiently to permit supporting block 91 to clear the inner ends of pins 87 and 89. Collets 107 are placed in recesses 97 and locked securely in place by retaining bar 117. Work pieces 99 are placed in the collets and are located vertically by stop members 103 in supporting block 11. Work pieces 99 may vary as much as several thousandths of an inch in size and so the bore 109 of the collets is of a size fitting the largest work piece to be received. Pins 87 and 89 on jaw members 27 and 29 are movable into passages 105 to engage collets 107 and flex the walls thereof to clamp work pieces 99 tightly in position.

When air valve 135 is turned to supply compressed air to the upper side of piston 125 that piston moves downward and moves piston 127 into pumping chamber 129 to supply an hydraulic fluid under pressure through hoses 139, 143, and 145 to jaw members 27 and 29. Hydraulic fluid under pressure enters through passages 53 and 55 into the space at the ends of recesses 31 and 33 adjacent to pistons 23 and 25. This hydraulic pressure maintains the "floating" pistons 23 and 25 tightly against the stop discs 49 and forces the jaw members 27 and 29 to be moved toward each other, against the force of springs 65 and 67.

Movement of jaw members 27 and 29 toward each other causes pins 87 and 89 to engage and flex the walls of collets 107 to clamp work pieces 99 tightly in position. Due to the variation in size of the work pieces the pins 87 and 89 would not engage the collets simultaneously except for the hydraulic compensation provided by the wax-like substance filling passages 75 and 77. When one of the pins 87 or 89 engages a collet before another of the pins, that pin is moved backward into the wax-like substance and the positions of each of the pins adjusted by the hydraulic action thereof until all of the pins have made contact with the collets. This hydraulic equalization of the position of the clamping pins continues during the flexing of the collets so that equal clamping force is applied to each of the work pieces. With the work pieces clamped tightly in position, the table 3 may be moved under the milling cutters 7 to make the desired cuts therein.

When it is desired to replace the work pieces with fresh ones, the air valve 135 is turned to supply compressed air to the underside of piston 125 and move the same to retract piston 127 and withdraw hydraulic fluid from the hydraulic motors formed by pistons 23 and 25 with jaw members 27 and 29. The withdrawal of the hydraulic fluid, together with the force of springs 65 and 67, moves jaw members outward to permit removal of the milled work pieces and insertion of fresh ones.

As is apparent from the foregoing description, the collets may be varied in internal size and shape of bores 109 to fit different work pieces. Blocks 69 and 71 which support clamping pins 87 and 89 may be replaced with other blocks having larger, smaller, fewer, or more clamping pins. In some uses of this vise the clamping pins 87 and 89 may clamp the work pieces directly, omitting the collets. Furthermore, the vise is readily adaptable to the clamping of single work pieces of varying size, since the clamping pins 87 and 89 can clamp points of different size on the surface of such a work piece (the block 91 would have to be suitably altered to provide a supporting recess for such a work piece). Of course, other modifications of this invention may be made without departing from the scope of intended coverage of the appended claims.

What is claimed as our invention is:

1. An hydraulically actuated vise for holding a plurality of work pieces in position including in combination, a supporting base member, a supporting rod supported on said base member and extending outwardly from opposite sides thereof, a pair of pistons positioned one at each end of said rod, a pair of jaw members supported on said rod and having recesses receiving said pistons, means to supply and withdraw a hydraulic fluid under pressure into the portion of each recess closed by said pistons and thereby to cause said jaw members to move inwardly and outwardly relative to said supporting base member, and a supporting member positioned on said base member and arranged to position work pieces for clamping by said movable jaw members.

2. An hydraulically actuated vise for holding a plurality of work pieces in position including in combination, a supporting base member, a supporting rod supported on said base member and extending outwardly from opposite sides thereof, a pair of pistons positioned one at each end of said rod, a pair of jaw members supported on said rod and having recesses receiving said pistons, means to supply and withdraw a hydraulic fluid under pressure into the portion of each recess closed by said pistons and thereby to cause said jaw members to move inwardly and outwardly relative to said supporting base member, a supporting member positioned on said base member and arranged to position work pieces for clamping by said movable jaw members, a plurality of laterally spaced pins supported on each of said jaw members for engagement with each of the work pieces, and hydraulic means in each jaw member permitting relative movement of said pins for equalizing the force applied through said pins to the work pieces.

3. An hydraulically actuated vise for holding a plurality of work pieces in position including in combination, a supporting base member, a supporting rod supported on said base member and extending outwardly from opposite sides thereof, a pair of pistons positioned one at each end of said rod, a pair of jaw members supported on said rod and having recesses receiving said pistons, means to supply and withdraw a hydraulic fluid under pressure into the portion of each recess closed by said pistons and thereby to cause said jaw members to move inwardly and outwardly relative to said supporting base member, a supporting block positioned on said base member and having a plurality of vertically extending recesses for supporting work pieces and having passageways extending laterally outward therefrom, a plurality of laterally spaced pins on each of said jaw members and aligned with said passageways for movement therein to clamp the work pieces in said recesses, and hydraulic means in each jaw member permitting relative movement of said pins for equalizing the clamping force applied to each of the work pieces.

4. A vise as defined in claim 3 in which there are provided hollow cylindrical collets fitting in said vertically extending recesses and having internal diameters of substantially the same size as the work pieces, each of said collets having a pair of diametrically spaced slots through the walls thereof and terminating in apertured portions adjacent the base thereof, and said pins in said jaw members being engageable with said collects to flex the walls thereof to clamp the work pieces tightly therein with substantially equal force.

5. A vise as defined in claim 4 in which said supporting base member has vertically extending recesses aligned with the vertically extending recesses in said supporting block and having rod shaped stop members therein determining the vertical position of the work pieces.

6. An hydraulically actuated vise for holding a plurality of work pieces in position including in combination, a supporting base member, a supporting rod supported on said base member and extending outwardly from opposite sides thereof, a pair of pistons positioned one at each end of said rod, a pair of jaw members supported on said rod and having recesses receiving said pistons, means to supply and withdraw a hydraulic fluid under pressure into the portion of each recess closed by said pistons and thereby to cause said jaw members to move inwardly and outwardly relative to said supporting base member, a supporting block positioned on said base member and having a plurality of vertically extending recesses for supporting work pieces and having passageways extending laterally outward therefrom, each of said jaw members having a longitudinal passageway therein closed at both ends and a plurality of laterally spaced passages extending outward therefrom, a viscous wax-like substance filling said longitudinal passageway, a plurality of pins in said passages extending into said wax-like substance and extending outwardly in alignment with the passageways in said supporting block for movement therein to clamp the work pieces in said recesses, and said wax-like substance acting as hydraulic means permitting relative movement of said pins for equalizing the clamping force applied to each of the work pieces.

7. A vise as defined in claim 6 in which said pins and passageways are in separate removable block portions on said jaw members and are operable to be exchanged for corresponding parts of different size, said supporting base member and said supporting block have aligned keyways with a key bar supported therein, hollow cylindrical collets are fitted in said vertically extending recesses and having internal diameters of substantially the same size as the work pieces, each of said collets having a pair of diametrically spaced slots through the walls thereof and terminating in apertured portions adjacent the base thereof, each of said collets having a cut out flat shoulder, a key plate secured to the supporting block and engaging said flat shoulders to secure said collets in position and to secure the same against rotation, and said pins in said jaw members being engageable with said collets to flex the walls thereof to clamp the work pieces therein with substantially equal force.

8. A vise as defined in claim 6 in which said supporting base member has vertically extending recesses aligned with the vertically extending recesses in said supporting block and having rod shaped stop members therein determining the vertical position of the work pieces.

9. An hydraulically activated vise for holding a plurality of work pieces in position including in combination, a supporting base member, having a laterally extending slot, a supporting rod supported in said slot on said base member and extending outwardly from opposite sides thereof, a pair of pistons positioned one at each end of said rod, and extending above the top surface of said supporting base members, a pair of jaw members supported on said rod and having recesses receiving said pistons, means to supply and withdraw a hydraulic fluid under pressure into the portion of each recess closed by said pistons and thereby to cause said jaw members to move inwardly and outwardly relative to said supporting base member, and a supporting member positioned on said base member and arranged to position work pieces for clamping by said movable jaw members.

10. An hydraulically activated vise for holding a plurality of work pieces in position including a combination, a supporting base member, a supporting rod supported on said base member and extending outwardly from opposite sides thereof, a disc shaped stop member secured on each end of said supporting rod, a pair of pistons slidably supported on said supporting rod abutting said stop members, a pair of jaw members supported on said rod and having recesses receiving said pistons, means to supply and withdraw a hydraulic fluid under pressure into the portion of each recess closed by said pistons and thereby to cause said jaw members to move inwardly and outwardly relative to said supporting base member, and a supporting member positioned on said base member and arranged to position work pieces for clamping by said movable jaw members.

11. A vise as defined in claim 10 in which said jaw members have passageways into said recesses, and there is provided an hydraulic piston pump connected to said passageways and having a double acting pneumatically operated piston for actuation thereof for supplying hydraulic pressure for movement of said jaw members.

12. An hydraulically actuated vise for holding a work piece of varying size in position including in combination, a supporting base member, a supporting rod supported on said base member and extending outwardly from opposite sides thereof, a pair of pistons positioned at opposite ends of said rod, a pair of moveable jaw members supported on said rod and having recesses receiving said pistons, means to supply and withdraw a hydraulic fluid under pressure into the portion of each recess closed by said pistons and thereby to cause said jaw members to move inwardly and outwardly relative to said supporting base member, and a supporting block positioned on said base member and arranged to position the work piece for clamping by said movable jaw members.

13. A vise as defined in claim 12 in which there are provided a plurality of laterally spaced pins supported on each jaw member for engagement with different portions of a work piece, and hydraulic means in each jaw member permitting relative movement of said pins for equalizing the force applied to the different portions of the work piece.

14. A vise as defined in claim 12 in which the supporting block on said base member is provided with vertically extending recesses for supporting working pieces and having passageways extending laterally outward therefrom aligned with and operable to receive the pins on said jaw members, said jaw members each having a longitudinal passageway closed at both ends and laterally spaced passages extending outward and receiving said pins, a viscous wax-like substance filling the passageway into which said pins extend and acting as hydraulic means permitting relative movement of said pins for equalizing the clamping force applied at different points on the work piece.

References Cited in the file of this patent
UNITED STATES PATENTS

| | | |
|---|---|---|
| 2,339,799 | Obecny | Jan. 25, 1944 |
| 2,339,800 | Obecny | Jan. 25, 1944 |
| 2,366,979 | Obecny | Jan. 9, 1945 |
| 2,415,520 | Obecny | Feb. 11, 1947 |
| 2,542,986 | Bowen | Feb. 27, 1951 |
| 2,764,046 | Heinrich | Sept. 25, 1956 |